(12) United States Patent
Hazama

(10) Patent No.: US 6,178,325 B1
(45) Date of Patent: *Jan. 23, 2001

(54) COMMUNICATION DEVICE HAVING POSITION REGISTRATION IN A MULTIPLE SERVICES COMMUNICATION SYSTEM

(75) Inventor: Kaori Hazama, Tokyo (JP)

(73) Assignee: Mitsubishi Denki Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/772,721

(22) Filed: Dec. 23, 1996

(30) Foreign Application Priority Data

Jan. 12, 1996 (JP) .................................. 8-003998

(51) Int. Cl.$^7$ ...................................... H04Q 7/20
(52) U.S. Cl. ................................ 455/432; 455/435
(58) Field of Search ............................ 455/435, 432, 455/422, 427, 426

(56) References Cited

U.S. PATENT DOCUMENTS

| | | | |
|---|---|---|---|
| 4,876,738 | * 10/1989 | Selby | 455/435 |
| 5,247,698 | * 9/1993 | Sawyer et al. | 455/435 |
| 5,475,862 | * 12/1995 | Sawyer | 455/435 |
| 5,479,483 | 12/1995 | Furuya et al. | |
| 5,710,805 | * 1/1998 | Armbruster et al. | 455/435 |

FOREIGN PATENT DOCUMENTS

| | | |
|---|---|---|
| 4351127 | 12/1992 | (JP) . |
| 6506818 | 7/1994 | (JP) . |

* cited by examiner

*Primary Examiner*—Nguyen Vo
(74) *Attorney, Agent, or Firm*—Rothwell, Figg, Ernst & Manbeck

(57) ABSTRACT

The communication device according to the present invention outputs data as to whether position registration to a cellular service has succeeded or failed to a position registration control section using a transmission path. The communication device also outputs data as to whether position registration to a satellite service has succeeded or failed to the control section using a transmission path. The control section receives and records a result of position registration in each service, and then outputs data, when a service to be provided to a user is switched, as to where position registration in the service is required or not, using a transmission path to a multiple service switching communication control section.

2 Claims, 13 Drawing Sheets

| ROAMING MODES | METHOD OF PROVIDING SERVICES TO USERS |
|---|---|
| SATELLITE SERVICES ONLY | ONLY SATELLITE SERVICES PROVIDED TO USERS |
| CELLULAR SERVICES ONLY | ONLY CELLULAR SERVICES PROVIDED TO USERS |
| SATELLITE SERVICES PREFERRED | SATELLITE SERVICES PROVIDED PREFERENTIALLY TO THE OTHERS, BUT CELLULAR SERVICES ARE PROVIDED WHEN THE SATELLITE SERVICES CAN NOT BE RECEIVED |
| CELLULAR SERVICES PREFERRED | CELLULAR SERVICES PROVIDED PREFERENTIALLY TO THE OTHERS, BUT SATELLITE SERVICES ARE PROVIDED WHEN THE CELLULAR SERVICES CAN NOT BE RECEIVED |

FIG.2

| | GENERATED EVENTS | CONTENTS |
|---|---|---|
| A | CHANGE OF ROAMING MODE SETTING BY USERS | 1. ROAMING MODE SWITCHED FROM THE CELLULAR TO SATELLITE ONLY<br><br>2. CELLULAR ONLY SWITCHED TO THE SATELLITE PRIORITY WHEN THE SATELLITE CAN BE RECEIVED<br><br>3. CELLULAR ONLY SWITCHED TO THE SATELLITE PRIORITY WHEN THE CELLULAR CAN NOT BE RECEIVED AND THE SATELLITE CAN BE RECEIVED<br><br>4. CELLULAR ONLY SWITCHED TO THE CELLULAR PRIORITY WHEN THE CELLULAR CAN NOT BE RECEIVED AND THE SATELLITE CAN BE RECEIVED |
| B | CATCHING AND MONITORING A LINE | 1. A SITUATION IN WHICH THE CELLULAR CAN BE RECEIVED SWITCHED TO A SITUATION IN WHICH IT CANNOT BE RECEIVED UNDER THE CONDITIONS OF CELLULAR PRIORITY AND IN WHICH THE SATELLITE CAN BE RECEIVED<br><br>2. A SITUATION IN WHICH THE SATELLITE CAN NOT BE RECEIVED SWITCHED TO A SITUATION IN WHICH IT CAN BE RECEIVED UNDER THE CONDITIONS OF SATELLITE PRIORITY AND IN WHICH THE SATELLITE CAN NOT BE RECEIVED |

FIG.3

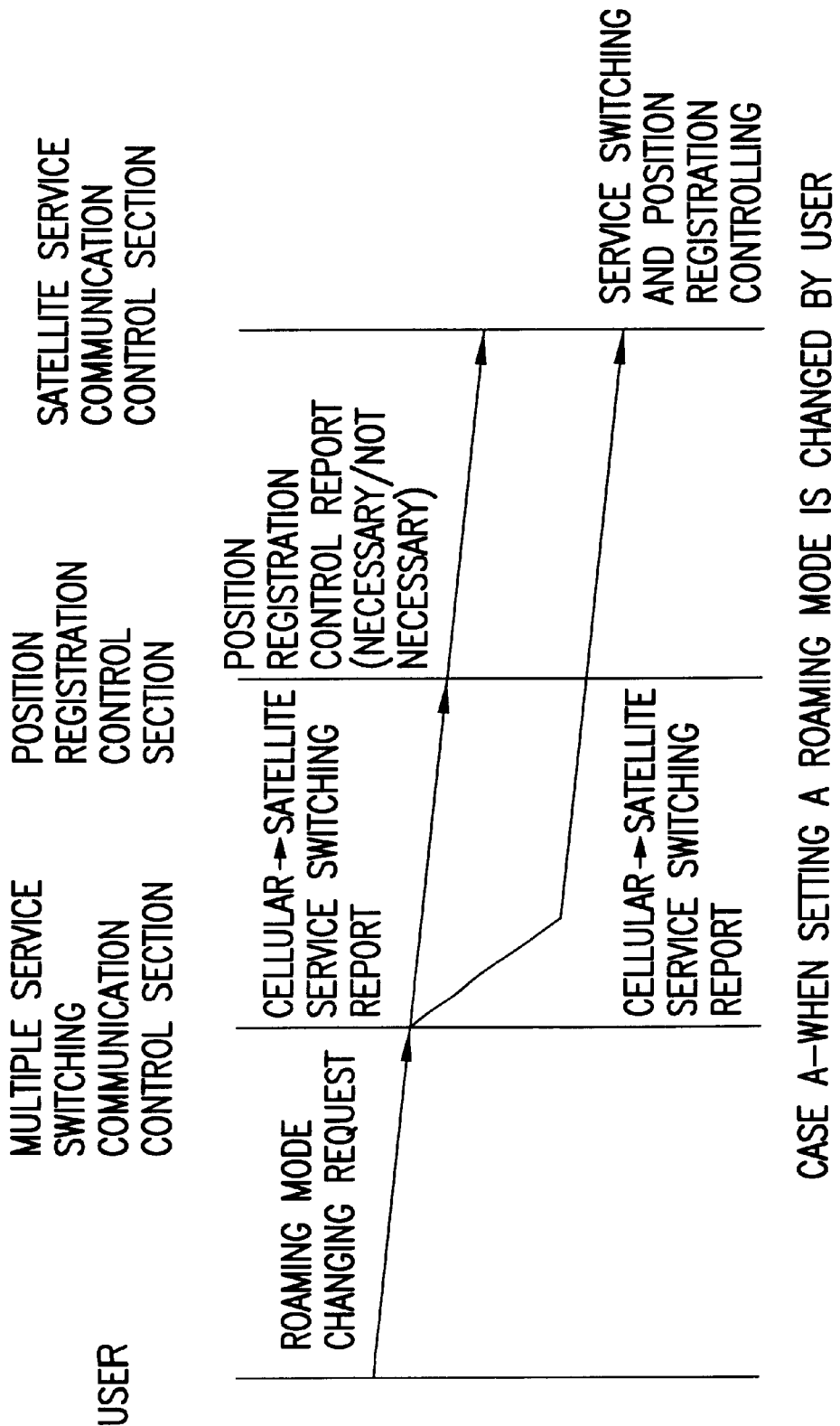

```
MULTIPLE SERVICE RADIO                    SATELLITE
COMMUNICATION DEVICE 3                    SERVICE B
         │                                    │
         │      OUTGOING CALL REQUEST         │
         │───────────────────────────────────▶│
         │                                    │
         │      CHANNEL SETTING REPORT        │
COMPLETION OF                                 │
POSITION │◀───────────────────────────────────│
REGISTRATION                                  │
         │                                    │
```

OPERATION FOR COMPLETION OF POSITION REGISTRATION
FOR SUPPLEMENTING THE PROBLEM 1

FIG.7A

```
MULTIPLE SERVICE RADIO                    SATELLITE
COMMUNICATION DEVICE 3                    SERVICE B
         │                                    │
         │                                    │
         │         INCOMING CALL REPORT       │
COMPLETION OF                                 │
POSITION │◀───────────────────────────────────│
REGISTRATION                                  │
         │                                    │
```

OPERATION FOR COMPLETION OF POSITION REGISTRATION
FOR SUPPLEMENTING THE PROBLEM 2

FIG.7B

COMPLETION OF POSITION REGISTRATION FOR SERVICE A

FAILURE OF POSITION REGISTRATION FOR SERVICE B

EXECUTION AND COMPLETION OF POSITION REGISTRATION FOR SERVICE A

COMMUNICATION DEVICE HAVING POSITION REGISTRATION IN A MULTIPLE SERVICES COMMUNICATION SYSTEM

FIELD OF THE INVENTION

The present invention relates to a communication device, and more particularly to a radio communication device in which a plurality of communication services can be utilized with one unit of radio communication device.

BACKGROUND OF THE INVENTION

In recent years, mobile satellite communications has been developing for commercial use. However, telephone charges in satellite communications are generally expensive, and power consumption is far greater as compared to that in a mobile terminal providing services from a ground station. Accordingly, a user usually uses services in a ground system as much as possible in an area where the ground system can be used, and uses a satellite system in an area where the ground system can not be used. In the system described above, it is desirable that services in the satellite system and those in the ground system are utilized with one terminal unit from view points of reduction in a required number of terminals as well as of user's convenience.

FIG. 10 is a block diagram showing a relation between a plurality of radio communication services and multiple services radio communication device in a communication system based on the conventional technology and showing the radio communication device for the same. In the figure, designated at reference numeral 1 is a cellular service radio communication device, at 2 a satellite service radio communication device, at 3 a multiple services radio communication device including therein the cellular service communication device 1 and the satellite service communication device 2. The reference numeral 1a indicates a service A communication control section provided in the cellular service radio communication device 1 and for catching lines for service A and controlling communications, and the reference numeral 2a indicates a service B communication control section provided in the satellite service radio communication device 2 and for catching lines for service B and controlling communications. Herein, the service A corresponds to the cellular service, while the service B corresponds to the satellite service.

The reference numeral 4 indicates a base station of the communication system interfacing to radio communication services for providing services, for example services A and B, to the multiple services radio communication device 3. The reference numerals 5a, 5b indicate a transmission path for position registration signals comprising analog signals or digital signals to the radio communication services A and B respectively. The reference numerals 1b, 2b indicate a transmission path for signals indicating a situation for catching receiving lines for each of services from the services A, B communication control sections respectively. The reference numeral 1c, 2c indicate a transmission path for signals indicating services each provided to a user respectively. The reference numeral 6 indicates multiple services switching communication control section. The reference numeral 6a indicates a transmission path for a signal indicating which of the services is being provided to a user, and the reference numeral 6b indicates a transmission path for a signal indicating contents of a service selected by and transmitted from a user.

Next description is made for an operation for switching services provided to a user and a position registering operation in the multiple services radio communication device.

Signals 1b, 2b each indicating a situation of catching receiving lines for services A and B respectively are transmitted from the service A communication control section 1a and service B communication control section 2a to the multiple services switching communication control section 6. The multiple services switching communication control section 6 receives these signals 1b, 2b, and analyzes and determines which of the services from the service A and service B should be provided to a user.

Then the multiple services switching communication control section 6 outputs signals 1c, 2c each indicating a new service provided to a user as a result of analysis of the signals respectively to the service A communication control section 1a as well as to the service B communication control section 2a. The service A communication control section 1a and the service B communication control section 2a understand which of the services is to be provided to the user by receiving the result, and as a result, the communication control section 1a or 2a which is to control a service to be provided anew executes position registration. Furthermore the multiple services switching communication control section 6 informs the user of the service which has been selected with the signal 6a.

The multiple services switching communication control section 6 switches the service to one to be provided to the user, in response to the request 6b from the user, by outputting the signals 1c, 2c indicating the service, and can execute position registration for the communication control section 1a or 2a for controlling the selected new service.

As described above, in the radio communication system based on the conventional technology, each time when a service to be provided to a user is changed, position registration for a base station for the next new service has to be executed.

Next, description is made for a mechanism of generation of unnecessary position registration between the base station and a terminal in the radio communication system based on the conventional technology.

FIGS. 11A to 11C are views showing a sequence of position registration in the radio communication system based on the conventional technology. FIG. 11A shows a state 1, FIG. 11B shows a state 2, and FIG. 11C shows a state 3 respectively.

At first, description is made for the state 1 with reference to FIG. 11A. The multiple services radio communication device 3, which is a terminal, catches a line for the service A, and executes position registration therefor. On the other hand, the multiple services radio communication device 3 does not execute position registration for the service B.

In this step, the service A in the side of base station recognizes that the position of this terminal has been registered under the service A. The multiple services radio communication device 3, which is a side of terminal, also recognizes that the position registration for the service A is completed.

Next description is made for the state 2 with reference to FIG. 11B. In the state 2, it is assumed that a service provided to a user is automatically or manually switched from the service A to the service B. However, in a case where position registration for the service B is failed for some reasons or other, the service B, which is the side of base station, recognizes that position registration of the terminal, i.e. of the communication system device 3, has not been executed under the service. On the other hand, the service A still has recognition that the position registration has continuously been kept under the service.

Furthermore, description is made for the state 3 with reference to FIG. 11C. In the state 3, it is assumed that a service provided to a user is automatically or manually returned to the service A. In this step, in the position registration control based on the conventional technology, a position is registered again to the service A. However, execution of the position registration at the second time is not required because the service A, which is the side of base station, still has kept the recognition that the position registration for the terminal has been completed even if the position registration has not been executed in this step.

As described above, by executing position registration each time when a service provided to a user is changed, an unnecessary control of position registration for the base station is generated, and the terminal side executes position registration which is unnecessary for the side of base station.

Next, FIG. 12 shows an interface for position registration. Herein, description is made for generation of unnecessary position registration between the station and a terminal.

As shown in FIG. 12, a position registration interface is executed with signals only for a request from the terminal side as well as for a response from the side of base station.

Description is made for normal operations according to FIG. 12. At first, a registration request for requiring position registration is transmitted from a terminal, device 3, to the base station. The base station receives, device 4 the registration request, and transmits a registration response to the terminal. At this time, the base station recognizes that the position registration is completed. The terminal side also receives the registration response, and recognizes that the position registration is completed.

Next, a case wherein the base station transmits a response to the registration request to the terminal but the terminal can not receive the response due to some external reasons is assumed. In this case, the base station recognizes that the position registration has been completed. The terminal side recognizes that the position registration has been failed. For this reason, the terminal side executes position registration again which is unnecessary for the base station.

Accordingly, by executing again the position registration each time when position registration is failed, unnecessary control for position registration for the base station is generated as described above, and the terminal side executes position registration which is unnecessary for the base station.

It should be noted that the technological background in relation to the present invention is disclosed in Japanese Patent Laid-Open Publication No. HEI 4-351127, and Japanese Patent Laid-Open Publication No. HEI 6-506818.

In the radio communication devices communicating with a plurality of terminals based on the conventional technology, as described above, position registration has to be executed each time when a service provided to a user is changed or when position registration is failed. For this reason, there have been generated some problems such as generation of a control for position registration and an output for transmission, which are unnecessary to the base station which is a new service as a destination for radio communications, for instance, when power to the multiple services radio communication device is turned ON, when a service to be provided is automatically and manually changed, and when position registration is failed.

In addition, there has been a problem that because the unnecessary position registration request is transmitted from the radio communication device, the base station has to execute processing for the position registration corresponding thereto which also causes the base station to be highly loaded in response thereto.

Furthermore, there has been a problem that a transmission request such as a outgoing call request which is a request from a user is refused because a transmitting/receiving control section is controlling for transmission of position registration while unnecessary transmission thereof is executed in the radio communication device.

SUMMARY OF THE INVENTION

It is an object of the present invention to prevent unnecessary position registration in a communications device and in a system of the type described.

The communication device according to the present invention can communicate with a plurality of services interfacing at a base station of the communication device, and the communication device has a position registration control section for controlling position registration according to a situation of position registration concerning a new service as a destination for switching when the services are switched, which makes it possible to prevent unnecessary position registration.

The communication system according to the present invention is a communication system comprising a first communication device, which is a terminal of the communication system, for communicating with a first service and a second communication device connected to the first communication device and for communicating a second service, and the first communication device has a position registered situation transmitting means for transmitting information concerning the situation of position registration for the first service to the second communication device, and the second communication device has a position registration controlling means for controlling position registration, when the services are changed, according to information concerning the situation of position registration for the first service transmitted from the position registered situation transmitting means or information concerning the situation of position registration for the second service in the second communication device, so that, in a case where a different type of communication device is connected thereto, unnecessary position registration can be prevented.

In the communication system according to the present invention, the position registered situation transmitting means according to the second invention transmits information concerning the situation of position registration for the first service in response to connection between the first communication device and the second communication device, so that, in a case where a different type of communication device is connected thereto, information for position registration for each of the devices can be managed in one place, which makes it possible to prevent unnecessary position registration.

The communication system according to the present invention comprises a communication device for transmitting a position registration request and an outgoing call and a base station for transmitting a result of position registration according to the position registration request to the communication device and also transmitting a channel setting report according to the outgoing call request, and the communication device recognizes completion of position registration according to the channel setting report transmitted from the base station, so that unnecessary position registration can be prevented.

The communication system according to the present invention comprises a communication device for transmitting a position registration request and a base station for transmitting a result of position registration according to the position registration request to the communication device and also transmitting an incoming call report to the communication device in response to the outgoing call to the communication device, and the communication device recognizes completion of position registration according to the incoming call report transmitted from the base station, so that unnecessary position registration can be prevented.

The communication device according to the present invention, in the device enabling communication with a plurality of beam systems, comprises a position registration control section for controlling position registration according to the situation of position registration concerning a new beam system as a destination for switching when the beam systems are switched, so that unnecessary position registration can be prevented.

Other objects and features of this invention will become understood from the following description with reference to the accompanying drawings.

BRIEF DESCRIPTION OF THE DRAWINGS

FIG. 2 shows an interface and a processing flow between the communication devices in Embodiment 1;

FIG. 3 shows an interface and a processing flow between communication devices in Embodiment 2;

FIG. 7 shows an interface between a service having a function of completion of position registration for a satellite service and a communication device in Embodiment 3;

DESCRIPTION OF THE PREFERRED EMBODIMENT

Figure 1:
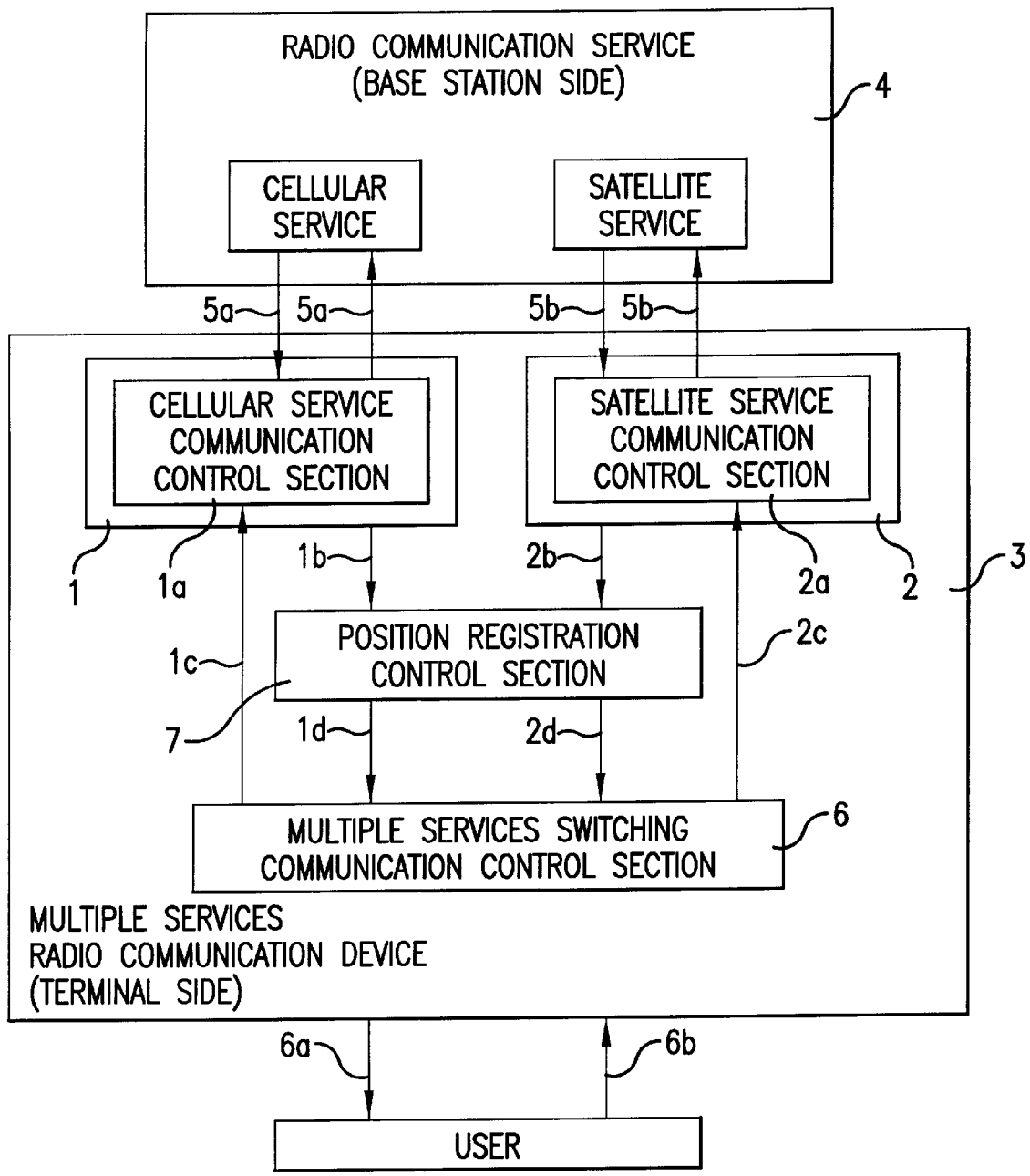
FIG. 1 is a block diagram showing a relation between a base station and a communication device and the communication device according to Embodiment 1 and Embodiment 2 of the present invention.

FIG. 1 is a block diagram showing a multiple services radio communication device 3 in an embodiment of the present invention. This is multiple services radio communication device 3 which comprises a terminal of the present communication system both services of a cellular service and a satellite service are supported with the terminal, the communication device 3.

In the figure, the reference numeral 1 indicates a cellular service radio communication device, and a cellular service can be provided with this cellular service radio communication device alone or with that connected to a communication device 2 described later. The reference numeral 2 indicates a satellite service radio communication device, and the reference numeral 3 indicates the multiple services radio communication device provided as a terminal and including therein the cellular service radio communication device 1 and satellite service radio communication device 2. The reference numeral 1a indicates a cellular service communication control section provided in the cellular service radio communication device 1 and for catching a line for the cellular service and controlling communications, while the reference numeral 2a indicates a satellite service communication control section provided in the satellite service radio communication device 1 and for catching a line for the satellite service and controlling communications.

The reference numeral 4 indicates a radio communication service comprising a base station in the present communication system and for providing communication service to the multiple services radio communication device 3. The reference numerals 5a, 5b indicate a transmission path for signals for position registration comprising an analog or a digital signal to a cellular service and a satellite service respectively. The reference numerals 1b, 2b indicate a transmission path for signals indicating a situation of catching receiving lines for each service from the cellular service communication control section 1a and the satellite service communication control section 2a, respectively. The reference numerals 1c, 2c indicate a transmission path for signals indicating services to be provided to users respectively.

Designated at the reference numeral 6 is multiple services switching communication controlling section, at 6a a transmission path for signals indicating which of the services is provided to a user, and at 6b a transmission path for a signal indicating selected contents of a service from a user.

Furthermore, designated at the reference numeral at 7 is a position registration control section, and at 1d, 2d a transmission path for a signal indicating whether position registration outputted from the position registration control section to the multiple services switching communication control section 6 is required or not respectively.

Description is made hereinafter for operations in the embodiment.

The communication device 1 outputs a result of execution indicating whether position registration for the cellular service has succeeded or failed to the position registration control section 7 by using the transmission path 1b. The transmitting path 1b may be a serial interface or a parallel interface. On the other hand, the communication device 2 outputs a result of execution indicating whether position registration for the satellite service has succeeded or failed also to the position registration control section 7 by using the transmission path 2b.

The position registration control section 7 receives a result of execution of position registration in each service and records the results, then outputs data as to whether position registration for a new service is required or not to the multiple services switching communication control section by using the transmission paths 1d, 2d in a case where services to be provided to a user are switched.

Herein, description is made for causes for switching a service to be provided to a user as well as for operations in that step.

The communication device 3 generally has a function in which a user can select any of services to be provided thereto (called as a roaming mode setting function hereinafter) as shown in FIG. 2.

Namely, only a satellite service is provided to a user in the mode of "satellite service only", and only a cellular service is provided to a user in the mode of "cellular service only". The satellite service is preferentially provided in the mode of "satellite service preferred", but when the satellite service can not be received, the cellular service is provided. The cellular service is preferentially provided in a mode of "cellular service preferred", but when the cellular service can not be received, the satellite service is provided.

Figure 4B:
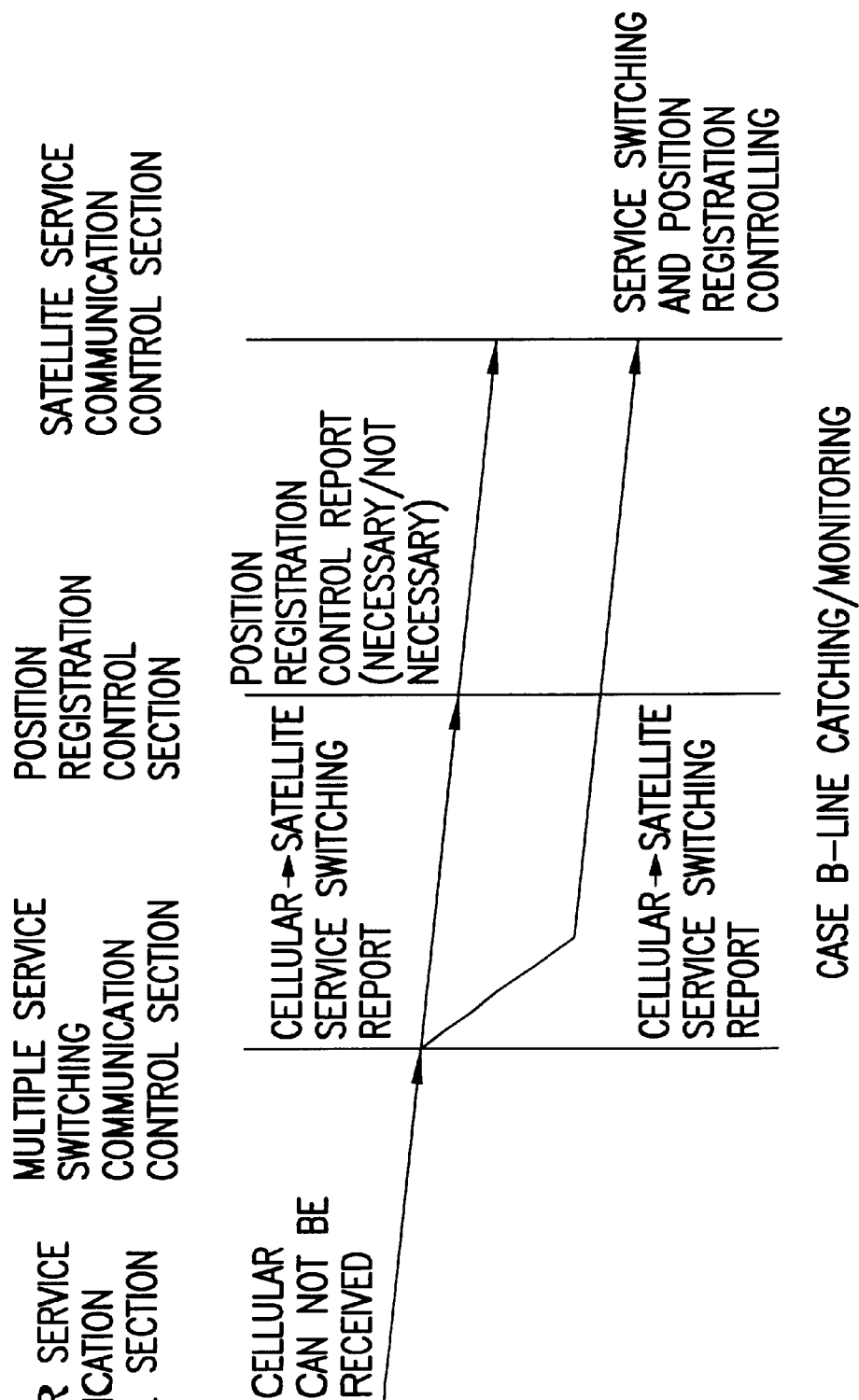
FIG. 4 shows set items of services provided to users which any user can set, and a method of providing the services in Embodiment 2.

Description is made of timing of events when a service to be provided to a user is switched from the cellular service to the other service in performing this function in the communication device 3 having each of the modes as shown in FIG. 2, with reference to FIG. 3 and FIG. 4.

At first, there is a case where the roaming mode is switched an other mode by a user itself, and FIG. 3 shows a case indicated as a case A. In this case, there are 4 cases such as a case where the roaming mode is switched from the cellular only mode to the satellite only mode, a case where the roaming mode is switched from the cellular only mode to the satellite priority mode in a state in which the satellite service can be received, a case where the roaming mode is switched from the cellular only mode to the satellite priority mode under the situation in which the cellular service can not be received and the satellite service can be received, and a case where the roaming mode is switched from the cellular only mode to the cellular priority mode under the situation in which the cellular service can not be received but the satellite service can be received.

In these cases, as shown in FIG. 4, a user transmits a roaming mode change request to the multiple services switching communication control section 6 through the transmission path 6b. The control section 6 informs contents of, for instance, switching a service A from the cellular service to the satellite service B according to the contents of the roaming mode change request to the position registration control section 7. The position registration control section 7 transmits a report indicating whether the position registration is required or not to the satellite service communication control section 2a. The satellite service communication control section 2a controls the position registration according to the report from the position registration control section 7.

Herein, the position registration control section 7 issues an instruction as to whether the position registration should be executed in the satellite service communication control section 2a or not according to, for instance, the fact whether the position registration for the satellite service, which is a new service as a destination for switching, has been executed or not. Namely, if position registration has been executed in the service as a destination for switching, it is determined that new position registration is not necessary, and position registration control section 7 issues an instruction that position registration is not necessary. In this case, position registered performance in the service as a destination for switching is evaluated with reference to time when the last position registration is executed, and if position registration is executed within a prespecified period of time, it is determined that position registration is not required, and if it is not executed within a prespecified period of time, it may be determined that position registration is required.

A case is conceivable where position registration is generated by monitoring a catch of a line. Namely, there are two cases of a case in a cellular priority mode where the cellular service can not be received in a state in which the satellite service can be received, and of a case in a satellite priority mode where the satellite service becomes possible to be received in a state in which the cellular service can not be received.

In these cases, as shown in FIG. 4, a report indicating that the cellular service can not be received is transmitted from the cellular service communication control section 1a to the multiple services switching communication control section 6. The multiple services switching communication control section 6 provides a report of switching a service from the cellular service to the satellite service to, for instance, the position registration control section 7. The position registration control section 7 transmits a report of controlling position registration indicating whether position registration is required or not according to the notice from the multiple services switching communication control section 6 to the satellite service communication control section 2a. The satellite service communication control section 2a controls position registration according to the notice from the position registration control section 7.

As described above, in the embodiment of the present invention, requirement of position registration is transmitted from the position registration control section to the communication control section 2 without fail in the immediately preceding interface from a service switching response which is a timing for the switching when services to be provided to a user are switched. Then a report that a provided cellular service is changed to the satellite service is provided thereto from the multiple services switching communication control section 6, so that service switching is generated, and position registration is controlled.

With this feature, the position registration control section can manage all situations of position registration in the cellular service, so that determination to reduce unnecessary position registration for the satellite service can be executed.

As described above, when conditions, in which a service is switched to the other due to various causes such as changes of the state of a line for each service or similar causes, are ready, the multiple services switching communication control section 6 selects a service as a destination for switching to each of the service communication control sections 1a, 2a by using the transmission paths 1c, 2c, and also simultaneously provides a requirement of position registration thereto. With this feature, a service communication control section 1 or 2, which is the service as a destination for switching, either executes position registration or does not execute it.

With these operations, the position registration control section 7 can monitor situations of position registration for all possible situations of the service A and B designated, and the service as a destination for switching may execute position registration according to the report indicating requirement of position registration only when position registration is required.

As described above, the communication device 3 according to the invention described in the embodiment can communicate with multiple services A and B, and has a position registration control section 7 for controlling position registration according to a situation of position registration concerning a new service as a destination for switching when the services are switched, which makes it possible to prevent unnecessary position registration.

Embodiment 2 relates to a case where the communication device 1 and the communication device 2, each of which is a discrete unit, are used by connecting them to each other.

The communication devices 1 or 2 based on the conventional technology have no means for outputting information for controlling position registration for a service such as a cellular service to other communication devices. For this reason, information for controlling position registration for the cellular service when the communication device 1 alone is operated is outputted when the communication device 1 is connected to the communication device 2. In the invention according to the embodiment, information for position registration is exchanged between the communication devices 1 and 2. With this feature, the position registration control section 7 can monitor and record all results of controlling position registration for the cellular service and satellite service as a position registered performance in each of the services, which makes it possible to determine a requirement of position registration when a next service to be switched is generated as well as to control the position registration.

Configuration of the device to which the invention according to Embodiment 2 is applied is the same as that in FIG. 1, and to be more specific, it the position registration control section 7 is already connected to the communication devices 1 and 2. The cellular service communication control section 1a has a position registered situation transmitting means. The communication device 1 and the communication device 2 can be connected to each other through a connector or the like, and in a case of the connection, electric configuration is the same as that in FIG. 1. Furthermore, the communication device 2 has a means for detecting whether the communication device 2 is connected to the communication device 1 or not.

Figure 5:
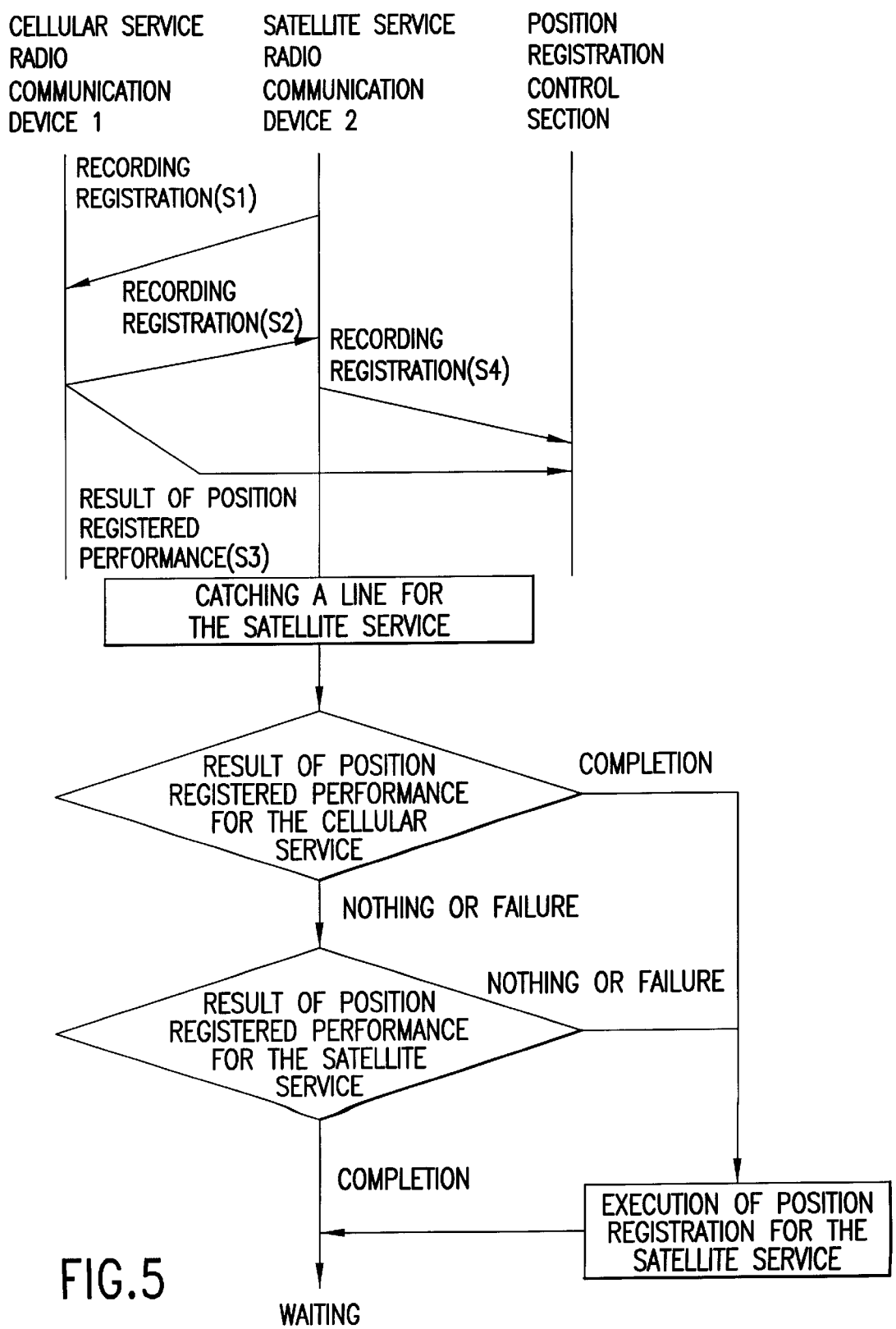
FIG. 5 shows a service provided to a user and a timing to be changed in Embodiment 2.

Next description is made for operations of a communication system according to Embodiment 2 with reference to FIG. 5.

The communication device 2 monitors whether the communication device 1 and the communication device 2 are connected to each other or not. In a case where the communication device 2 determines that the communication device 1 is connected thereto, the communication device 2 transmits a signal S1 indicating the connecting state to the communication device 1. The communication device 1 having received the signal S1 recognizes that the device 2 is connected thereto. Furthermore, the communication device 1 transmits a response signal S2 to the signal S1 to the communication device 2, and also transmits a position registered situation S3 the cellular service communication device 1 to the position registration control section 7 and to the communication device 2.

Also a position registered situation S4 of the satellite service communication device 2 is transmitted to the position registration control section 7.

Then in a case where the communication device 2 controls services to be provided to a user, the communication device 2 controls position registration according to a position registered situation S3 to the cellular service received when the device 1 is connected thereto, as well as to a position registered situation S4 to the satellite service.

For instance, if information for position registration indicates a completion of position registration for the cellular service, position registration for the satellite service has to be executed, on the other hand if position registration for the cellular service is not executed or is failed, position registration is executed only when position registered performance to the satellite service is not recognized.

In the embodiment, when the communication device 1 is connected to the communication device 2, the interface and flow as shown in FIG. 5 described above are realized, whereby the communication device 2 can manage each of the possible of position registered situations to the cellular service communication device 1. Also with the management, it is possible to reduce position registration for the service.

As described above, the communication system according to the invention described in the embodiment comprises the first communication device 1 for communicating with a first service which is, for instance, the cellular service A and the second communication device 2 connected to the first communication device 1 and for communicating with a second service which is, for instance, the satellite service B, and the first communication device 1 has the position registered situation transmitting means for transmitting information concerning the situation of position registration for the first service to the second communication device 2, and the second communication device 2 has the position registration control section for controlling position registration. When the services are switched, according to information concerning the situation of position registration for the first service 1 transmitted from the position registered situation transmitting means or according to information concerning the situation of position registration for the second service in the second communication device, where another type of communication device is connected to its respective service, unnecessary position registration can be prevented.

Especially, the position registered situation transmitting means in the cellular service communication device transmits information concerning the situation of position registration for the first service in response to the connection of the first communication device to the second communication device, so that in a case where another type of communication device is connected thereto, information concerning position registration of each of the communication devices can integrally be managed within the multiple services radio communication device 3, which makes it possible to prevent unnecessary position registration.

Embodiment 3 relates to a position registration request an a report of a result of the position registration.

Figure 6:
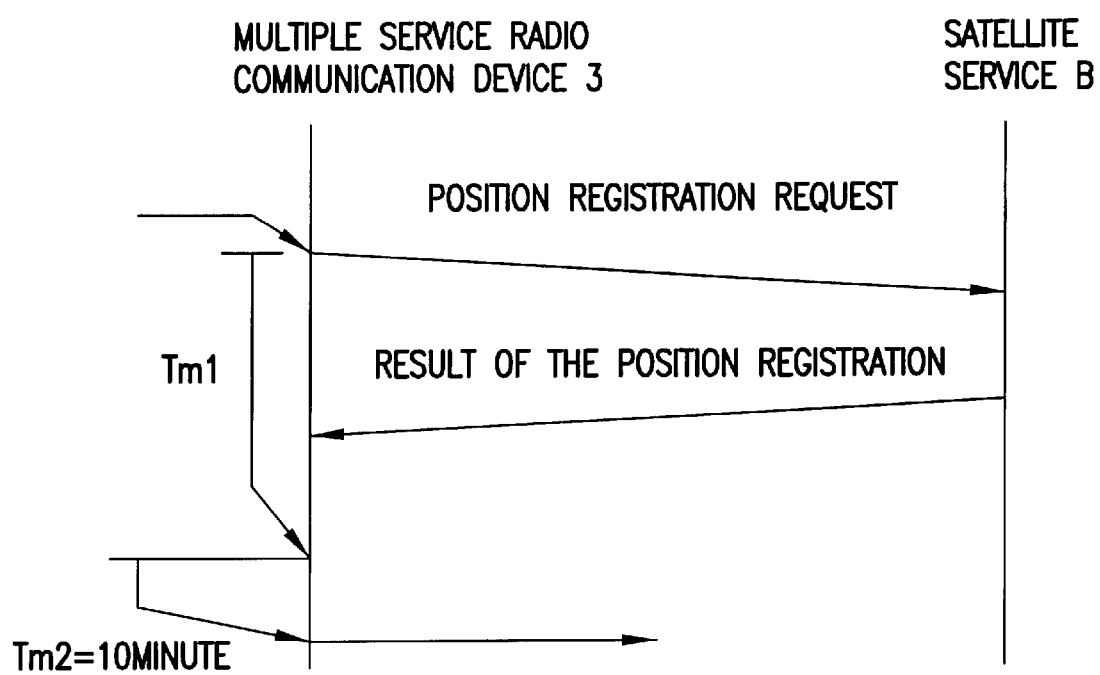
FIG. 6 shows an interface between a radio communication service in position registration for a satellite service and a communication device which is a terminal in Embodiment 3.

FIG. 6 is a view showing an interface between the communication service B and the communication device 3 in position registration for the satellite service.

At first description is made for operations of position registration with reference to FIG. 6. The multiple services radio communication device 3 comprising a terminal at first, transmits a position registration request to the communication service 4 in the base station. At that time, the terminal operates an incorporated timer and measures a prespecified period of time Tm1. The base station receives the position registration request and registers the position, and also transmits a result of the position registration to the terminal. The terminal side receives the result of position registration.

Next description is made for a case where the terminal side does not receive the result of position registration from the base station side within a prespecified period of time Tm1. In this case, the position registration request is again transmitted to the base station side after a period of time Tm2 has passed.

Herein, there are generated a problem 1 and a problem 2 as follows. These problems are solved in a further embodiment.

The problem 1: In a case where the base station can not receive the request due to external environmental causes such as blocking although the terminal transmits a position registration request, the terminal does not execute the position registration for a few minutes thereafter, so that communication to be received transmitted from the base station side may be wasted for that period of time.

The problem 2: Although the base station side outputs a report for a result of position registration, the terminal side sometimes fails to receive it due to external environmental causes as that in the problem 1. In that case, although the base station side recognizes completion of the position registration, the terminal recognizes the position registration as a failure, so that the terminal side outputs the position registration request again after a few minutes therefrom.

Namely, as described in Embodiments 1 and 2, information for position registration in the cellular service is managed, and when the information of controlling indicates a completion of the position registration, the position registration is not executed. Although unnecessary position registration is reduced, an operation of controlling unnecessary position registration is sometimes generated in controlling position registration itself for the satellite service. It is a further object of the invention according to the embodiment to solve these problems.

Description is made for operations of the communication system according to the embodiment of the invention with reference to FIG. 7.

FIG. 7a) is a view for explaining operations of the communication system for solving the problem 1 described above. The problem 1 is a case where the position registration request transmitted from the terminal can not be received by the base station. In this case, the terminal detects a registration report transmitted from the base station, and recognizes the fact that the position registration is normally being executed, so that the terminal is controlled so as not to execute the position registration again. Accordingly, the terminal generates a timing for recognizing completion of position registration even when another interface with the base station for other than the position registration is executed.

Position registration is executed for coinciding recognition of use and services to be provided in the terminal with those in the base station for effectively providing services to users. For this purpose, if the terminal recognizes completion of position registration even at another timing, other than the interface for position registration, in which recognition in the terminal coincides with that in the station, unnecessary operations for controlling position registration in the terminal can be reduced thereafter.

FIG. 7b) is a view for explaining operations of the communication system for solving the problem 2 described above. The problem 2 is a case where a report for a result of the position registration transmitted from the base station can not be received by the terminal. In this case, in receiving an incoming call from the base station, the terminal recognizes completion of the position registration simultaneously with the incoming call. The terminal is thus controlled so as not to execute position registration again.

As described above, the communication system according to the invention described in the embodiment comprises the communication device 3 for transmitting a position registration request and an outgoing call request, and a base station 4 for transmitting a result of the position registration in response to the position channel setting request to the communication device 3 and for transmitting a registration report in response to the outgoing call request. The communication device recognizes completion of the position registration according to the channel setting report transmitted from the base station 4, so that unnecessary position registration can be prevented.

The communication system described above comprises the communication device 3 for transmitting a position registration request, and a base station 4 for transmitting a result of the position registration in response to the position registration request to the service communication devices 1 or 2 above and for transmitting a report of a responsive incoming call to the communication device 1 or 2. The communication device 3 recognizes completion of the position registration according to the notice of incoming call transmitted from the base station 4, so that unnecessary position registration can be prevented.

Services for the communication system in the embodiment are applicable not only to the satellite service B but also to the normal cellular service A.

In the embodiment 4, the invention described in Embodiments 1 and 2 is applied not between different services, but especially between beams in the satellite service B.

Figure 8:
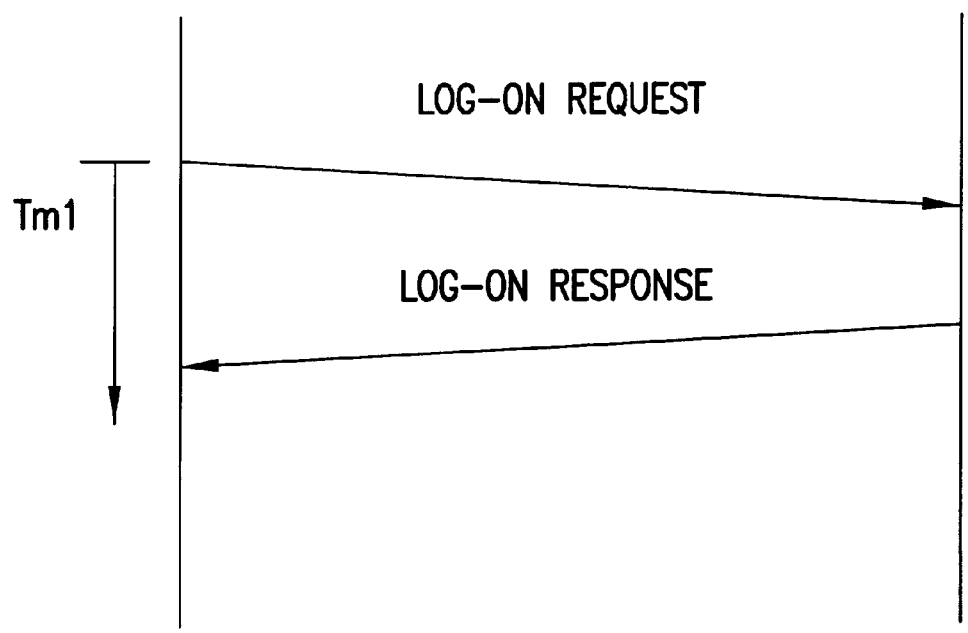
FIG. 8 shows an interface between a beam system in log-on to the beam system of a satellite service and a communication device which is a terminal in Embodiment 4.

FIG. 8 is a flow diagram for explaining operations of position registration in the satellite service.

In the satellite service, beams are allocated to, for instance, each area. It is required to execute position registration for each of the beams respectively. An operation of position registration for each of the beams is called as "log-on".

At first, description is made for a normal log-on operation with reference to FIG. 8. The multiple services radio communication device 3 transmits a log-on request to the satellite service 4 in the base station, and at the same time operates a timer. When it receives the log-on request, the base station 4 transmits a log-on response to the terminal side.

Figure 9:
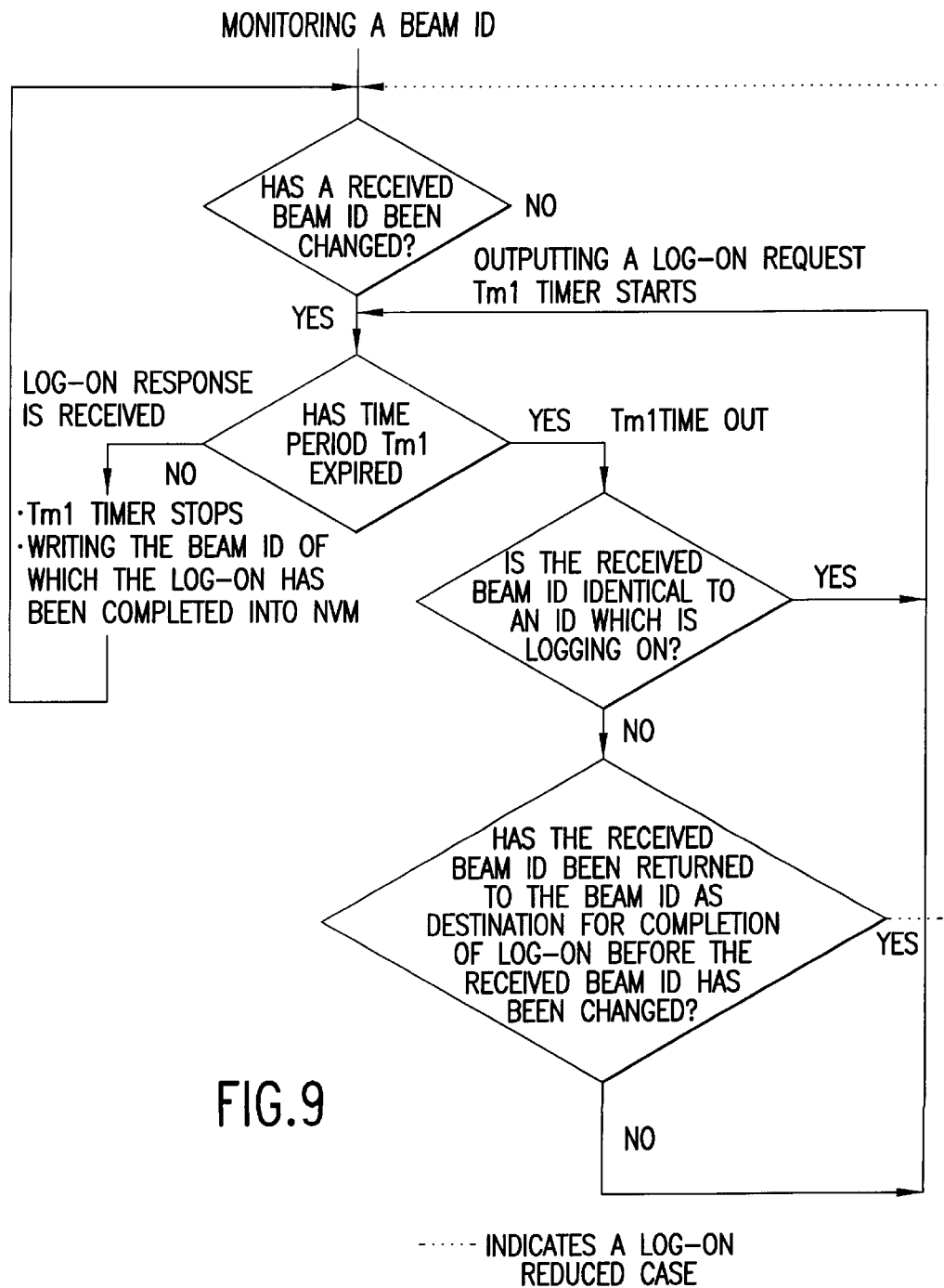
FIG. 9 shows a flow of reducing unnecessary log-on in Embodiment 4.
Figure 10:
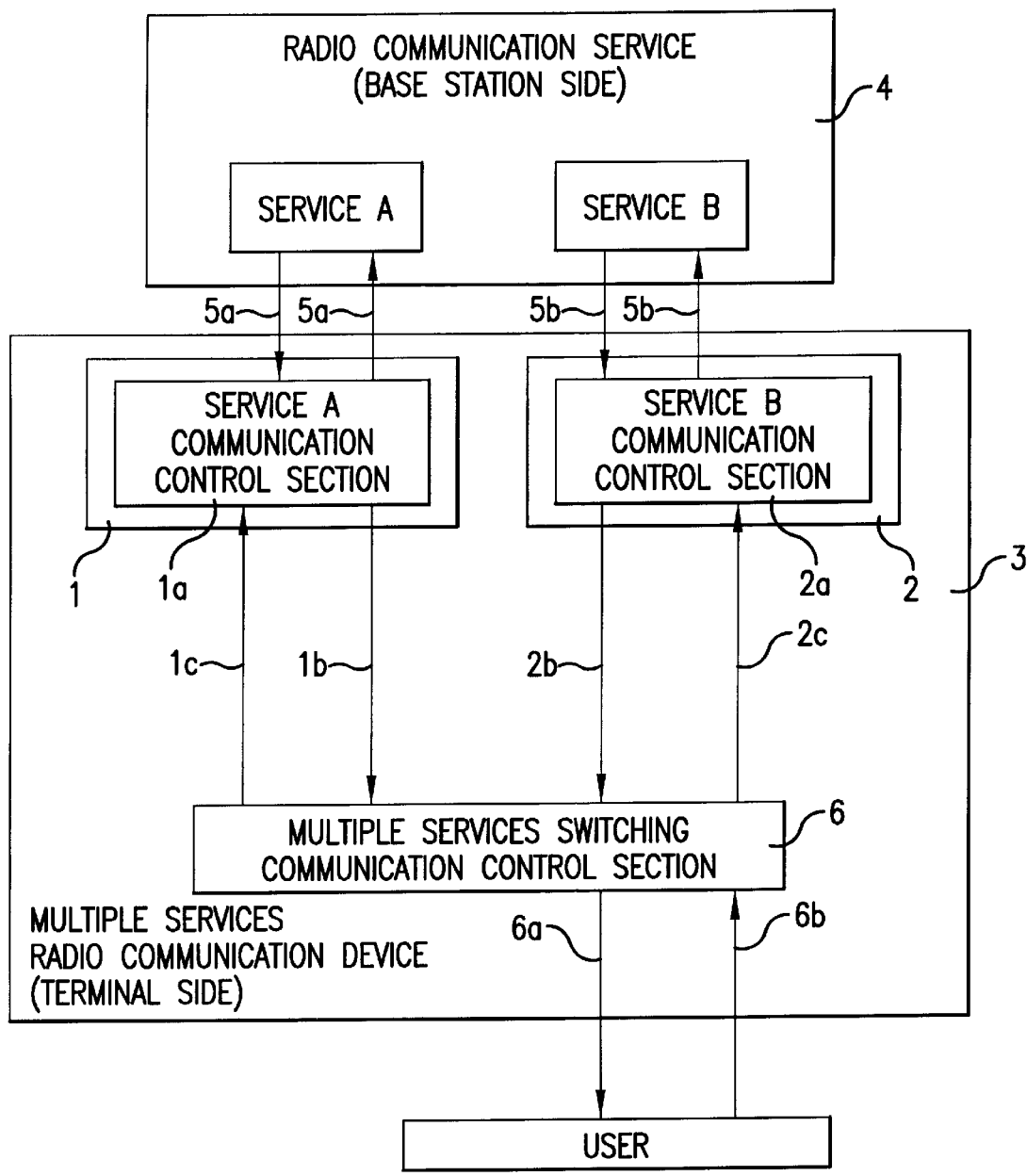
FIG. 10 is a block diagram showing a relation between the communication service based on the conventional technology and multiple services radio communication device and the communication device.
Figure 11A:
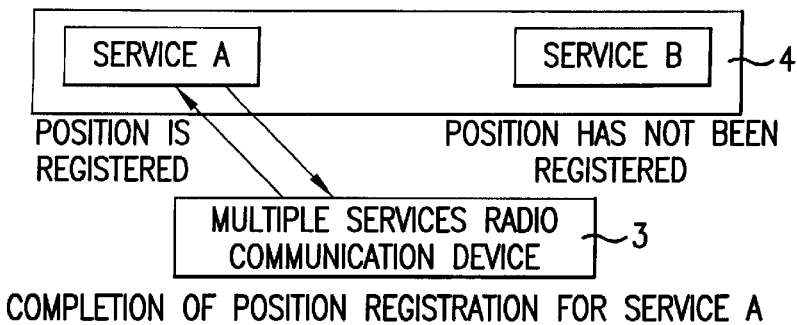
FIGS. 11A to 11C are sequence showing a case where unnecessary position registration is generated in the terminal based on the conventional technology.
Figure 11B:
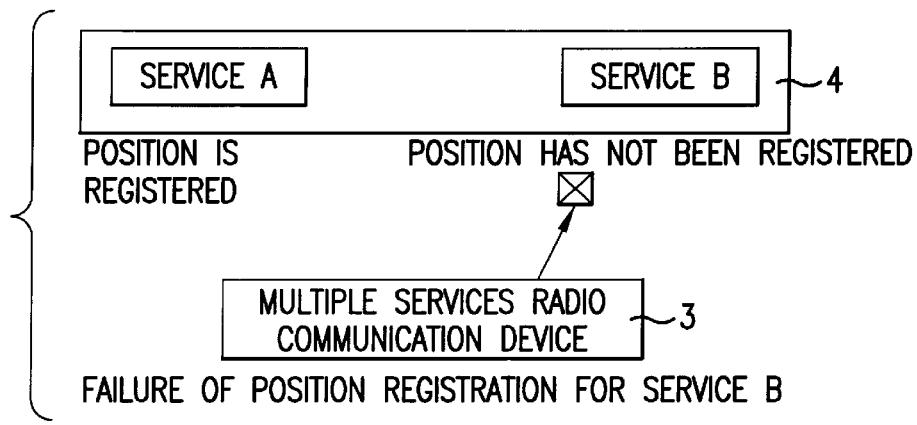
Figure 11C:
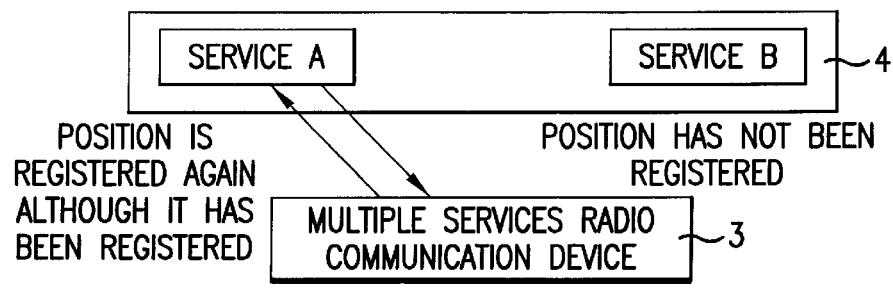
Figure 12:
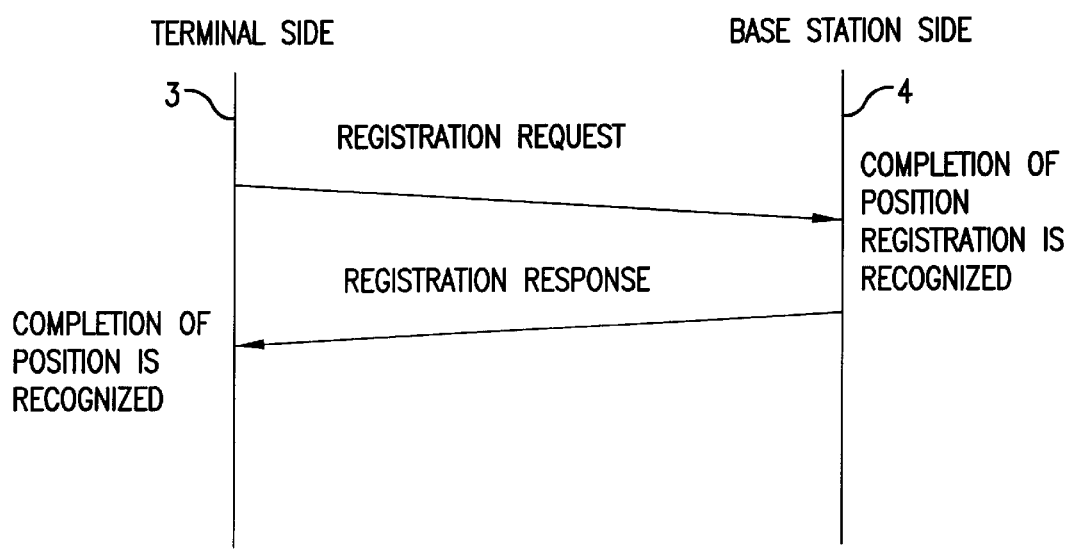
FIG. 12 shows a position registration interface between the terminal side and the base station side.

Then, detailed description is made for operations of a log-on in the satellite service with reference to FIG. 9.

In this example, it is assumed that the terminal is shifted from a first beam having a first beam ID to a second beam having a second beam ID. At first, the terminal monitors a beam ID which is unique identifier allocated to each of the beams. In a case where it detects that the received beam ID has been switched in Step 1, the terminal outputs a log-on request. The terminal also starts a timer concurrently therewith. In this example, the terminal detects that the beam is changed from the first beam ID to the second beam ID.

In a case where it receives a log-on response from the base station within a prespecified period of time Tm1, the terminal 3 stops the timer, and recognizes that the log-on has been completed. Then the terminal side writes the beam ID into a NVM. On the other hand, in a case where a log-on response is not received within the prespecified period of time Tm1, system control shifts to Step 2.

In Step 2, determination is made as to whether the beam ID received at that point of time is identical to the second beam ID received in Step 1 or not. In a case where the two beams are identical, the terminal side outputs a log-on request again. In a case where both are different from each other, system control shifts to Step 3. In Step 3, determination is made as to whether the beam ID received in Step 2 returns to the first beam ID of which log-on has been completed or not. In a case where it is determined that the beam ID has returned to the first beam ID, system control returns to Step 1 again. In step 3, in a case where the beam does not return to the first beam ID, the terminal outputs a log-on request. The terminal in this embodiment has such a configuration that in a case where the log-on has already been finished, the case is detected and a log-on is not executed again. The terminal based on the conventional technology has such a configuration that a log-on request is transmitted to the base station 4 each time when a beam ID is changed, namely when a beam is changed.

In the present embodiment, the device 3 enabling communication with a plurality of beams has a position registration control section 7 for controlling position registration according to a situation of position registration concerning a beam so that in a case in which the beams are changed, unnecessary position registration can be prevented.

It should be noted that, in Embodiments 1 and 2, description was made for the communication device 3 which can communicate with two types of services, but it is not limited to the configuration as described above, and the device is applicable to a communication device which can communicate with further types of services. Types of service are not limited to a cellular service nor a satellite service, and services other than the services are not excluded.

This application is based on Japanese patent application No. HEI 8-003998 filed in the Japanese Patent Office on Jan. 12, 1996, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A communication system comprising a first communication device for communicating with a first service and a second communication device connected to said first communication device for communicating with a second service; wherein said first communication device has a position registered situation transmitting means for transmitting information concerning the situation of position registration for the first service to said second communication device, and said second communication device has a position registration control section for controlling position registration, when the services are switched, according to information concerning the situation of position registration for the first service transmitted from said position registered situation transmitting means or information concerning the situation of position registration for the second service in said second communication device.

2. A communication system according to claim 1 wherein said position registered situation transmitting means transmits information concerning the situation of position registration for said first service in response to connection between said first communication device and said second communication device.

* * * * *